March 16, 1948.    R. HASTINGS, JR    2,437,953
ELEVATING TRUCK
Filed Jan. 17, 1945    2 Sheets-Sheet 1
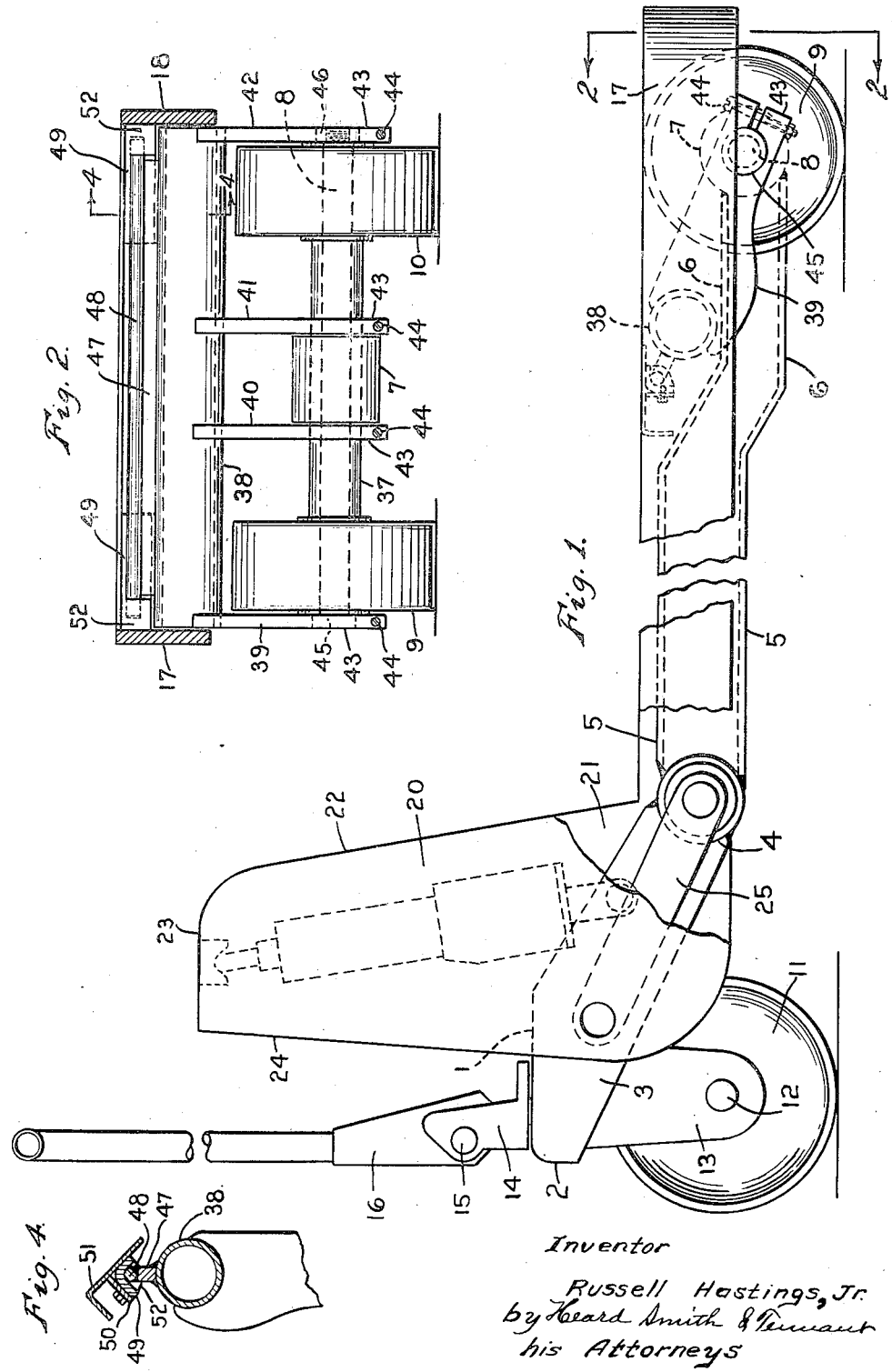
Inventor
Russell Hastings, Jr.
by Heard Smith & Tennant
his Attorneys

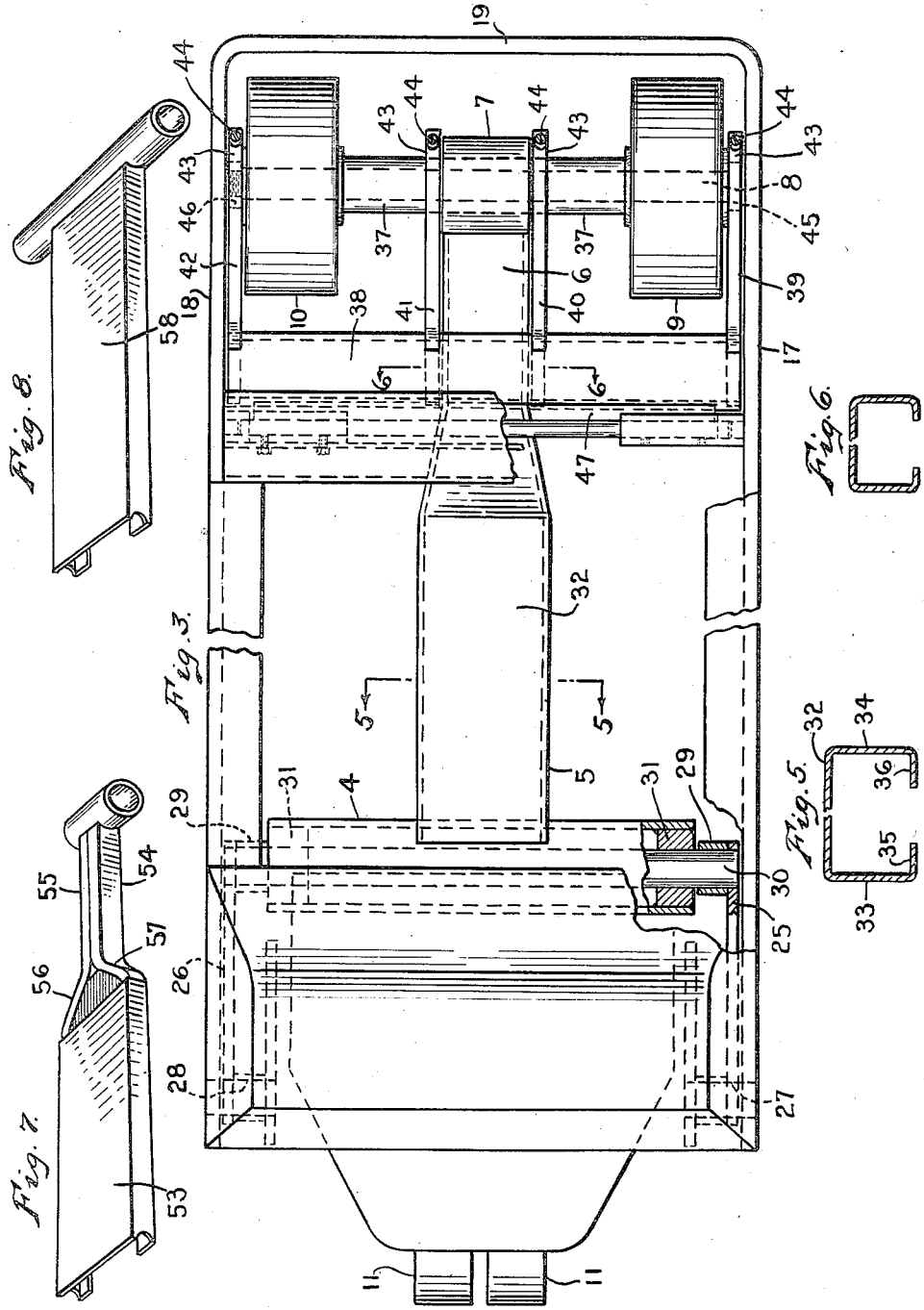

Patented Mar. 16, 1948

2,437,953

UNITED STATES PATENT OFFICE 2,437,953

ELEVATING TRUCK

Russell Hastings, Jr., Wellesley, Mass., assignor to Lewis-Shepard Company, Watertown, Mass., a corporation of Massachusetts Application January 17, 1945, Serial No. 573,283

17 Claims. (Cl. 254—10)

This invention relates to improvements in elevating trucks and the general object of the invention is to provide an elevating truck of lighter weight than those heretofore designed for transporting loads of the same maximum weight, which has adequate lateral stability, which is so constructed as selectively to permit the use of narrow metal rear wheels or wider rear wheels having a resilient tread without material change in construction and which requires a minimum cost of repair or replacement of worn parts.

Elevating trucks of the general type upon which the present invention is an improvement are usually constructed of fabricated structural plates and bars and comprise a heavy wheel supported main frame, a load supporting means mounted thereon by inclined parallel links with means for raising and lowering the load supporting means relatively to the frame.

One of the objects of the invention is to provide an elevating truck of less weight and equal stability and capacity to those heretofore constructed which will result in a saving of material and also decrease the effort of the operator in transporting a loaded truck to its destination and returning the empty truck therefrom, particularly in view of the fact that in the normal operation of such trucks the operator is required to move the truck empty about fifty per cent of the time. A difference in the weight of the truck, whether loaded or unloaded, imposes corresponding exertion upon an operator moving the heavier truck.

A further object of the invention is to provide a light elevating truck with novel means for effectively resisting torsional strains thereby to secure adequate lateral stability.

Another object of the invention is to provide an elevating truck with selective means for spacing and supporting the rear wheels which will permit the use of narrow metal wheels or wider wheels having resilient tires and enabling the substitution of one type of wheel for the other by merely changing the length of the mechanism for spacing and supporting the rear wheels.

Another object of the invention is to provide a rear link for the parallel link mechanism having a horizontal torque-resisting beam pivotally connected to the load supporting means in proximity to its load supporting surface and having arms pivotally mounted upon the rear axle and straddling the rear wheels in such manner as to prevent conical wear of the peripheries of the wheels which occurs in trucks in which the wheels are mounted in the ends of an overhung axle, for even though a heavy axle is employed it always tends to deflect some, even though a small amount, and this tends to wear the wheels cone-shaped.

These and other objects and features of the invention will more fully appear from the following description and the accompanying drawings and will be particularly pointed out in the claims.

In the drawings:

Fig. 1 is a side elevation of an elevating truck embodying the invention and illustrating in dotted lines hydraulic mechanism for raising and lowering the load supporting means;

Fig. 2 is a vertical sectional view on line 2—2 Fig. 1;

Fig. 3 is a plan view of the truck illustrated in Fig. 1, certain portions of the load supporting means being broken away to permit detail illustration of mechanisms thereunderneath;

Fig. 4 is a vertical sectional view on line 4—4 Fig. 2 of the torsional resisting beam upon the upper end of the rear link and illustrating its pivotal connection to the load supporting means;

Fig. 5 is a vertical sectional view on line 5—5 Fig. 3 of the reach connecting the head of the truck to the rear axle;

Fig. 6 is a similar sectional view on line 6—6 Fig. 3;

Fig. 7 is a perspective view of a modified form of reach; and,

Fig. 8 is a view of another form of reach.

The elevating truck illustrated in the accompanying drawings comprises a frame having a head provided with suitable wheeled steering mechanism and having at its rear end a rear axle housing in which is mounted an axle having suitably spaced rear wheels, load supporting means, mounted upon parallel front and rear links which are respectively pivotally mounted upon the steering head and the rear axle and suitably inclined to the horizontal. Means are provided for raising the front end of the load supporting means and the parallel front and rear links to cause the load supporting means to be maintained in parallelism with the floor as the load supporting means is raised as is usual in elevating trucks of this type.

As above stated, one of the principal objects of the invention is to provide torque-resisting means which will provide the truck with adequate lateral stability when the load supporting means is raised with an unbalanced load upon it.

In the construction shown in the drawings the frame of the truck comprises a head, preferably formed of fabricated plates, welded at their abutting or overlapping edges to provide a box-like construction comprising a top 1, a front side 2, parallel side plates 3 inclined downwardly and rearwardly and connected together at their rear ends by a cylindrically tubular beam 4 which will be referred to herein as a "bolster" connected by a reach to the rear axle in analogy to the well known wagon bolster and reach. A suitable reach 5, which extends rearwardly from and is rigidly secured to the bolster, preferably by welding, is provided with a relatively narrow end portion 6 which as illustrated in Fig. 1 is downwardly offset and has welded to it a narrow cylindrical axle housing 7 in which a rear axle 8 is journaled. The rear wheels 9 and 10 are mounted upon the end portions of the axle in the manner hereinafter described.

The head desirably is of the general construction disclosed in my prior Patent No. 2,234,925, March 11, 1941, and comprises preferably a pair of adjacent wheels 11 which are mounted upon an axle 12 in forks 13 of a steering post which is journaled in the head and has secured to it a forked member 14 in which is mounted a shaft 15 forming a fulcrum of the steering tongue 16 as illustrated and described in my prior patent aforesaid.

The load supporting means comprises a platform having parallel vertical side bars 17 and 18 which are integrally connected at their rear ends by a rear end bar 19 and are welded at their front ends to the lower portion of parallel plates 20 of a box-like standard preferably fabricated by upwardly converging side plates 21, a back plate 22 having a horizontal upper portion 23, and a front plate 24 of the character shown and described in my prior patent aforesaid. The front end of the load supporting means is supported upon parallel links 25 and 26 which are pivoted at their upper ends upon short shafts 27 and 28 extending inwardly from the side plates 20 and 21 of the standard and at their lower ends are provided with cylindrical bosses 29 which are keyed to a shaft 30 which is mounted in journals 31 fitting within and welded to the end portions of the bolster 4. The bolster 4 preferably is of cylindrical form adapted most effectively to resist torsional strains imposed upon it.

In the present embodiment of the invention the side bars of the usual heavy frame are omitted and a box-like reach, which may be wholly or partially fabricated from a sheet metal plate or other standard structural bars of lighter material than those heretofore employed for the side frames, is rigidly connected to and extends rearwardly from the bolster and merges into a relatively narrow end which is welded to the narrow axle housing 7 above described.

In the construction shown in Figs. 1 and 3 of the drawings the reach comprises a flat plate 32 having the sides 33 and 34 thereof bent downwardly at right angles thereto, thence bent inwardly to form flanges 35 and 36 in parallelism with the body of the plate to form a main box-like section and an integral relatively narrow downwardly offset box-like rear extension, the front end of the reach being welded to the bolster 4 and the rear end of the extension being welded to the narrow cylindrical axle housing as illustrated in Figs. 1 and 3. The reach may however be of other structural forms such, for example, as are illustrated in Figs. 7 and 8 hereinafter described.

In order to provide selective means for spacing and supporting the rear wheels which will permit the use of narrow metal wheels or wider wheels having resilient tires and enabling the substitution of one type of wheel for the other, a suitable spacing sleeve is detachably mounted in the rear axle housing and abuts at its respective ends against the inner ends of the bearings for the rear wheels 9 and 10. The rear axle 8 extends axially through the spacing sleeve 37 and the wheels are mounted upon the axle in suitable antifriction bearings, as tapered roller bearings. By reason of this construction a spacing sleeve of suitable length may be employed properly to engage the inner faces of the hubs of rear wheels of any width and by merely substituting spacing sleeves of different lengths the substitution of wide wheels for narrow wheels, or vice versa, can be readily made without otherwise modifying the truck construction.

The rear parallel link of the present construction is of a novel character so designed as effectively to resist torsional strains imposed upon it by an off-center or unbalanced load carried by the load supporting means and which when employed in connection with the torque-resisting construction of the head will further insure stability of the truck.

The torque-resisting construction of the rear link is required not only to provide lateral stability, but also to transmit the actuating force from the narrow central axle housing 7 and inner arms 40 and 41 to the outer arms 39 and 42.

In the preferred construction illustrated the rear link comprises a preferably cylindrical tubular torque-resisting beam 38 which extends horizontally between and with a small clearance at its ends from side bars 17 and 18 of the load supporting means, and is provided with means pivotally connecting the upper end of the rear link to the load supporting means in the manner hereinafter described. Suitable arms 39, 40, 41, and 42, preferably in the form of flat plates which are welded to the beam 38, extend downwardly and rearwardly therefrom and are provided respectively with bifurcated end portions 43. The bifurcated ends of the arms 40 and 41 engage the respective ends of the axle housing 7 and are clamped upon the spacing sleeve 37 by bolts 44. The bifurcated ends of the arms 39 and 42 are similarly clamped by bolts 44 upon the respective ends of the axle 8. In the preferred construction shown one end of the axle is provided with an enlarged cylindrical head 45 which lies within a complementary recess in the bifurcated end of the arm 39 and is fixedly clamped therein by a similar bolt 44. The opposite end of the axle is provided with a screw threaded portion upon which a preferably cylindrical nut 43 is mounted in a complementary recess in the bifurcated end of the arm 42 and is clamped by the bolt 44 after it has been set up properly to assemble the respective wheels against the ends of the spacing sleeve 37. The adjustability of the nut 46 also serves as a take-up properly to adjust bearings such as tapered roller bearings. The nut 46 is of cylindrical form and is provided with suitable holes or recesses to receive a spanner wrench.

By reason of this construction the outer arms 39 and 42 are fixedly secured to the axle and the arms 40 and 41 are similarly fixedly secured to the spacing sleeve 37 so that when the rear link is pivotally moved about the axis of the axle the whole assemblage forms a unitary structure. The ends of the axle do not project beyond the outer surfaces of the arms 39 and 42 so that the outer arms 39 and 42 may be positioned in close proximity to the side frames 17 and 18 of the load supporting means without engaging or rubbing against the side bars 17 and 18 of the load supporting means and the rear wheels spaced apart a maximum distance to contribute to the stability of the truck.

The preferred means for pivotally mounting the torque-resisting beam 38 of the rear link to the platform comprises a preferably rectangular bar 47 which extends longitudinally of the torque-resisting beam 38 nearly throughout its length and is welded thereto, as shown in Fig. 4. A cylindrical bearing rod 48 which is welded to the bar 47 engages preferably bronze L-shaped brackets 49 which are bolted to a vertical plate 50 which extends transversely of the load supporting means and which is welded to an angle plate 51 which extends horizontally across and is welded to the side plates 17 and 18 of the load supporting means. The outer ends of the L-shaped brackets are provided with webs 52 having oversized sockets into which the respective ends of the rod 48 extend. The bases of the sockets abut the respective ends of the rod and thereby prevent the rear link from shifting sidewise and the arms 39 and 42 from rubbing against the side bars 17 and 18 of the load supporting means. The pivot brackets are thus constructed so as not only to withstand the principal load or thrust from the rear link but also serve to hold the truck together during incidental handling which sometimes occurs wherein the truck is raised by an overhead hoist or other means by engagement of hooks with the load supporting means, it being important, of course, that the rear end of the frame and its wheels will not drop out of place during such handling.

By placing the centers of the upper pivots of the rear link as close as possible to the upper surface of the load supporting means the total compressive force in the upper frame and the tensile forces longitudinally of the lower frame are reduced to a minimum. This is made possible by so constructing the rear link as to permit a minimum diameter of rod to be used, since this rod is backed up on one side for its full length and the complementary sockets or pivot supports in the upper frame are likewise backed up through their full length by the transverse plates 50 and 51.

By reason of the above construction the pivot brackets can be easily replaced when worn or readily adjusted by means of shims to compensate for normal wear of the truck or for variations in the manufacture.

The torque-resisting construction which provides maximum lateral stability of the truck results principally from the torque-resisting construction of the rear link which assures that the rod 48 must always remain parallel to the axle 8 and therefore always parallel to the floor. And lateral stability is further assured by the combination, with said rear link, of the torque-resisting bolster upon which is mounted the front parallel links which are themselves keyed to a common shaft. This enables the employment of a reach having a relatively narrow rear axle housing, thus reducing the amount of width which must be allotted to the lower frame and thereby providing a maximum amount of space for the wide resiliently tired wheels.

It will be obvious that by providing a spacing sleeve of suitable length either narrow or wide wheels may be mounted upon the axle and that the substitution of one type of wheel for the other can therefore be readily made at a minimum cost.

A further advantage inherent in the present construction is that the arms 39—40, and 41—42 of the rear link straddle the respective wheels 9 and 10, thereby exerting equal pressures upon the portions of the axle in which the wheel is mounted which will avoid bending of the axle and consequent wearing of the wheels to conoidal form. Were it not for this straddle mounting the rear axle would have to be much larger and in turn necessitate bearings of much larger size than is required for the load carrying capacity.

Any suitable means may be provided for raising and lowering the load supporting means. Hydraulic mechanism which is diagrammatically illustrated in dotted lines within the standard of the load supporting means may be and preferably is similar to that disclosed in my prior Patent No. 2,234,925 aforesaid, and more in detail in Patent No. 2,161,660, granted June 6, 1939 to Frederick J. Shepard, Jr., and Nathaniel Warshaw, which is referred to therein.

By reason of the torque-resisting mechanism herein described the employment of a relatively light reach which will withstand the tensile strain imposed upon it may be employed.

Another form of reach is illustrated in Fig. 7 which comprises a box-like section 53 which is similar to that illustrated in Figs. 1 and 5 and extends partway to the axle housing 7 and the intermediate portion comprises plates or bars 54 and 55 which are welded at their rear ends to the axle housing and are provided with diverging sections 56 and 57 which extend within and are suitably welded to the channels of the box-like section 53. In some constructions the rear sections may be offset as shown in Fig. 1, while in others sufficient room may be present to enable the reach to extend straight from the bolster to the axle housing.

Another form of reach is illustrated in Fig. 8 in which the rectangular box-like reach construction 58 extends from the bolster to the axle housing and is welded to them in the manner heretofore described.

Other forms of reach, such as a skeletonized structure of standard angle bars or channel bars may also be employed, the purpose being to reduce the weight of the truck by elimination of the heavy frame present in other trucks of like capacity.

It will be obvious from the above description that by reason of the present invention a much lighter truck is provided than those heretofore constructed for the same load carrying capacity, that greater lateral stability is obtained, that means are provided which enable suitable narrow steel wheels or relatively wider resiliently tired wheels to be employed or substituted one for the other, and that the same contains other advantages heretofore mentioned.

It will be understood that the particular embodiment of the invention is of an illustrative character and that various changes in form, construction and arrangement of parts may be made within the spirit and scope of the following claims.

Having thus described the invention, what is claimed as new and desired to be secured by Letters Patent is:

1. An elevating truck comprising a frame having a head provided with wheeled steering mechanism and a transverse cylindrical horizontal tubular torque-resisting bolster, a reach rigid with said bolster extending rearwardly therefrom provided with a narrow tubular axle housing, a wheel spacing sleeve extending through said axle housing, an axle extending through said spacing sleeve having wheels mounted on the end portions thereof, load supporting means and means for raising and lowering the same including pivotally mounted front and rear parallel links inclined to the horizontal respectively connecting the load supporting means to the front bolster and to the rear axle, said rear link having at its upper end a tubular horizontal torque-resisting beam having means pivotally engaging the load supporting means, and having arms rigid with said beam detachably mounted on said spacing sleeve.

2. An elevating truck comprising a frame having a head provided with wheeled steering mechanism and having a transverse tubular torque-resisting bolster rigid therewith, a transverse shaft journaled in said bolster, a reach rigid with said torque-resisting bolster extending rearwardly therefrom having a relatively narrow rear end portion provided with a horizontal axle-housing, a rear axle mounted in said axle housing, rear wheels mounted on end portions of said axle, removable spacing means extending from the ends of said axle housing engaging the inner faces of the hubs of said rear wheels, means for raising and lowering said load supporting means including a pair of front links pivotally connected at their upper ends to the load supporting means and at their lower ends engaging the ends of said bolster shaft, and a rear link parallel to said front links having at its upper end a horizontal tubular torque-resisting means pivotally mounted on said load supporting means and located in proximity to the load supporting surface thereof and at its lower end mounted upon said axle and said spacing means acting in cooperation with the torque-resisting bolster to stabilize the load supporting means against distortion.

3. An elevating truck comprising a frame having a head provided with wheeled steering mechanism and having a transverse tubular torque-resisting bolster rigid therewith, a transverse shaft journaled in said bolster, a reach rigid with said torque-resisting bolster extending rearwardly therefrom having a relatively narrow rear end portion provided with a horizontal axle-housing, a cylindrical wheel-spacing sleeve journaled in said housing, a rear axle mounted in said sleeve, wheels mounted on said axle engaging the respective ends of said sleeve, load supporting means, means for raising and lowering the load supporting means including a pair of parallel front links suitably inclined to the horizontal connected at their upper ends to the load supporting means and at their lower ends engaging said bolster shaft, and a rear link parallel to said front links having at its upper end a horizontal torque-resisting means pivotally mounted on said load supporting means in proximity to the load supporting surface thereof and having arms integral with said torque-resisting means detachably secured to said spacing sleeve.

4. An elevating truck comprising a frame having a head provided with wheeled steering mechanism and a transverse cylindrical horizontal tubular torque-resisting bolster, a reach rigid with said bolster extending rearwardly therefrom provided with a narrow tubular axle housing, a wheel spacing sleeve rotatably mounted in said housing, an axle extending through and rotatably mounted in said spacing sleeve, wheels detachably mounted upon the end portions of the axle, load supporting means and means for raising and lowering the same including pivotally mounted front and rear parallel links inclined to the horizontal respectively connecting the load supporting means to the front bolster and to the rear axle, said rear link having at its upper end a cylindrical tubular horizontal torque-resisting beam having means pivotally engaging the load supporting means, and having inner and outer arms rigid with said beam detachably secured respectively to said spacing sleeve and to the end portions of said axle.

5. An elevating truck comprising a frame having a head provided with wheeled steering mechanism and a transverse cylindrical horizontal tubular torque-resisting bolster, a reach rigid with said bolster extending rearwardly therefrom provided with a narrow tubular axle housing, a wheel spacing sleeve rotatably mounted in said housing, an axle extending through and rotatably mounted in said spacing sleeve, wheels detachably mounted upon the end portions of the axle, load supporting means and means for raising and lowering the same including pivotally mounted front and rear parallel links inclined to the horizontal respectively connecting the load supporting means to the front bolster and to the rear axle, said rear link having at its upper end a cylindrical tubular horizontal torque-resisting beam having means pivotally engaging the load supporting means and having outer arms rigid with said beam detachably mounted on the ends of said axle, and having inner arms rigid with said beam detachably secured to said spacing sleeve.

6. An elevating truck comprising a frame having a head provided with wheeled steering mechanism and a transverse cylindrical horizontal tubular torque-resisting bolster, a reach rigid with said bolster extending rearwardly therefrom provided with a narrow tubular axle housing, an axle extending through said housing having wheels mounted on the end portions thereof, a spacing sleeve for said wheels mounted in said housing, load supporting means and means for raising and lowering the same including pivotally mounted front and rear parallel links inclined to the horizontal respectively connecting the load supporting means to the front bolster and to the rear axle, said rear link having at its upper end a cylindrical tubular horizontal torque-resisting beam having means pivotaly engaging the load supporting means and having outer arms rigid with said beam detachably engaging the ends of said axle and having inner arms abutting the respective ends of said axle housing detachably secured to said spacing sleeve, whereby sleeves of different lengths may be substituted properly to space rear wheels of different widths.

7. An elevating truck comprising a frame having a head provided with wheeled steering mechanism, a transverse horizontal tubular torque-resisting bolster, a reach rigid with said bolster extending rearwardly therefrom provided with a narrow tubular axle housing, an axle extending through said housing having wheels mounted on end portions thereof, spacing means extending from said housing to the respective wheels, load supporting means, and means for raising and lowering the same including front and rear parallel links inclined to the horizontal respectively connecting the load supporting means to the front bolster and to the rear axle, said rear link having at its upper end a tubular horizontal torque-resisting beam, a bar welded to said beam extending nearly the full length thereof, a cylindrical rod welded to said bar and extending a short distance beyond the respective ends thereof, angular bushings engaging the end portions of said rod, and means for detachably securing the respective bushings to a rigid transverse member of said load supporting means located in proximity to the upper surface of the load supporting member.

8. An elevating truck comprising a frame having a head provided with wheeled steering mechanism, a transverse horizontal tubular torque-resisting bolster, a reach rigid with said bolster extending rearwardly therefrom provided with a narrow tubular axle housing, an axle extending through said housing having wheels mounted on end portions thereof, spacing means extending from said housing to the respective wheels, load supporting means, and means for raising and lowering the same including front and rear parallel links inclined to the horizontal respectively connecting the load supporting means to the front bolster and to the rear axle, said rear link having at its upper end a tubular horizontal torque-resisting beam, a bar welded to said beam extending nearly the full length thereof, a cylindrical rod welded to said bar and extending a short distance beyond the respective ends thereof, angular bushings engaging the end portions of said rod, means for detachably securing the respective bushings to a rigid transverse member of said load supporting means located in proximity to the upper surface of the load supporting member, said bushings having webs provided with apertures to receive the ends of said rod and thereby to prevent separation of the rear end of the frame from the load supporting means if the truck is raised by lifting means engaging only the load supporting means.

9. An elevating truck comprising a frame having a head provided with wheeled steering mechanism, a transverse horizontal torque-resisting bolster, a reach rigid with said torque-resisting bolster and extending rearwardly therefrom comprising a flat plate having its edges fabricated to provide a box-like construction and having a tubular axle housing of narrow length welded to its rear end, an axle extending through said housing having wheels mounted on the end portion thereof, wheel-spacing means extending from said housing engaging the inner faces of the bearings of said wheels, load supporting means, and means for raising said load supporting means including front and rear parallel links inclined to the horizontal respectively connecting the load supporting means to the front bolster and to the rear axle, said rear link having at its upper end a tubular horizontal torque-resisting beam having means pivotally engaging the load supporting means, and arms rigid therewith straddling the respective rear wheels detachably clamped upon the end portions of said axle.

10. An elevating truck comprising a frame having a head provided with wheeled steering mechanism, a transverse horizontal torque-resisting bolster, a reach rigid with said torque-resisting bolster and extending rearwardly therefrom comprising a flat plate having its edges fabricated to provide a box-like construction and having a relatively narrow rear end, a tubular axle housing of narrow length welded to its rear end, an axle extending through said housing having wheels mounted on the end portion thereof, wheel-spacing means extending from said housing engaging the inner faces of the bearings of said wheels, load supporting means, and means for raising said load supporting means including front and rear parallel links inclined to the horizontal respectively connecting the load supporting means to the front bolster and to the rear axle, said rear link having at its upper end a tubular horizontal torque-resisting beam having means pivotally engaging the load supporting means, and having inner arms rigid therewith straddling said axle housing and detachably secured to said spacing means and outer arms straddling said rear wheels detachably secured to the ends of the axle.

11. An elevating truck having a head provided with steering mechanism, a reach extending rearwardly from said head having at its rear end a narrow axle housing, a rear axle mounted centrally in said axle housing and extending well beyond the respective ends thereof, widely spaced wheels rotatably mounted on end portions of said axle, load supporting means, and means for raising and lowering said load supporting means including suitably inclined front parallel links mounted on said head and load supporting means, a similarly inclined rear link provided with torque-resisting means having arms releasably clamped on the ends of said axle beyond the respective wheels adapted when released to permit withdrawal of said axle, and replaceable spacing means extending through said axle housing engaging the inner faces of the hubs of the respective wheels whereby wheels of any suitable width may be mounted upon said axle by substituting spacing means of suitable length.

12. An elevating truck having a head provided with steering mechanism, a reach extending rearwardly from said head having at its rear end a narrow axle housing, a rear axle centrally mounted in said housing extending well beyond the respective ends of said housing provided at one end with an enlarged head and screw threaded at its opposite end and provided with a nut, load supporting means having vertical side bars, means for raising and lowering said load supporting means including suitably inclined front parallel links mounted on said head and load supporting means and a similarly inclined rear link having its ends terminating adjacent to the respective load supporting side bars, said rear link having torque-resisting means pivotally engaging said load supporting means and having arms provided with bifurcated end portions releasably clamped respectively upon the head and nut of said axle.

13. An elevating truck having a head provided with steering mechanism, a reach extending rearwardly from said head having at its rear end a narrow central axle housing, a wheel-spacing sleeve rotatably mounted in said axle housing, an axle mounted in said housing and extending well beyond the respective ends thereof, having at one end an enlarged head and screw threaded at the other end and provided with a nut, load supporting means having vertical side bars, means for raising and lowering said load supporting means including suitably inclined front parallel links pivotally mounted on said head and load supporting means, and a similarly inclined rear link provided with transverse torque-resisting means in proximity to its pivotal connection to said load supporting means and terminating adjacent the respective side bars and having outer arms provided with bifurcated ends clamped respectively upon the head of the axle and upon said nut, and inner arms located adjacent to the ends of said axle housing having bifurcated ends clamped upon said spacing sleeve, whereby by adjusting said nut before the bifurcated ends of the outer arms of the rear link are clamped upon the head and nut of the axle the inner faces of the hubs of the wheels will be caused properly to engage the ends of the spacing sleeve.

14. An elevating truck having a head provided with steering mechanism, a reach extending rearwardly from said head having at its rear end a narrow axle housing, a large diameter replaceable tube rotatably mounted therein, and extending beyond the ends thereof, an axle of relatively small diameter mounted in said tube, widely spaced wheels mounted on end portions of said axle, load supporting means and means for raising and lowering said load supporting means including a rear lifting link comprising a torque-resisting transverse beam, four arms rigid therewith, the inner two arms being secured to the tube adjacent to the axle housing and the outer two arms being secured to the ends of said axle.

15. An elevating truck having a head provided with steering mechanism, a reach extending rearwardly from said head having at its rear end a narrow axle housing, a large diameter replaceable tube rotatably mounted therein and extending beyond the ends thereof, an axle of relatively small diameter mounted in said tube, widely spaced wheels mounted on end portions of said axle, relatively adjustable means on the ends of said axle engaging the outer wheel bearings and operable to clamp the inner wheel bearings against the respective ends of the sleeve, load supporting means and means for raising and lowering said load supporting means including a rear lifting link comprising a torque-resisting transverse beam, four arms rigid therewith, the inner two arms being secured to the tube adjacent the axle housing and the outer two arms being detachably secured to said relatively adjustable means on the ends of said axle.

16. An elevating truck having a head provided with steering mechanism, a reach extending rearwardly from said head having at its rear end a narrow axle housing, a large diameter replaceable tube rotatably mounted therein, and extending beyond the ends thereof, an axle of relatively small diameter mounted in said tube, widely spaced wheels mounted on end portions of said axle, relatively adjustable means on the ends of said axle engaging the outer wheel bearings and operable to clamp the inner wheel bearings against the respective ends of said sleeve, load supporting means and means for raising and lowering said load supporting means including a rear lifting link comprising a torque-resisting transverse beam, four arms rigid therewith, the inner two arms being secured to the tube adjacent the axle housing and the two outer arms having means clampingly engaging the wheel adjusting means on said axle and lying within the thickness of said arms.

17. An elevating truck having a head provided with steering mechanism, a reach extending rearwardly from said head having at its rear end a narrow axle housing, a large diameter replaceable tube rotatably mounted therein and extending beyond the ends thereof, an axle of relatively small diameter mounted in said tube, widely spaced wheels mounted on end portions of said axle, relatively adjustable means on the ends of said axle engaging the outer wheel bearings and operable to clamp the inner wheel bearings against the respective ends of the sleeve, load supporting means and means for raising and lowering said load supporting means including a rear lifting link comprising a torque-resisting transverse beam, four arms rigid therewith, each having bifurcated ends, the two inner arms being clamped upon said sleeve and the two outer arms being clamped upon said adjustable means on the ends of said axle with said adjustable means lying within the thickness of the respective outer arms.

RUSSELL HASTINGS, Jr.

REFERENCES CITED

The following references are of record in the file of this patent:

UNITED STATES PATENTS

| Number | Name | Date |
| --- | --- | --- |
| 1,325,222 | Whalley | Dec. 16, 1919 |
| 1,773,935 | Barrett | Aug. 26, 1930 |
| 2,087,861 | Quayle | July 20, 1937 |
| 2,152,849 | Hennessy | Apr. 4, 1939 |
| 2,217,704 | Quayle | Oct. 15, 1940 |
| 2,244,118 | Quayle | June 3, 1941 |